United States Patent [19]

Yoshida

[11] Patent Number: 5,081,606

[45] Date of Patent: Jan. 14, 1992

[54] CUBE ROOT CALCULATION APPARATUS

[75] Inventor: Kunio Yoshida, Nara, Japan

[73] Assignee: Sharp Kabushiki Kaisha, Japan

[21] Appl. No.: 564,288

[22] Filed: Aug. 8, 1990

[30] Foreign Application Priority Data

Aug. 10, 1989 [JP] Japan .................................. 1-207713

[51] Int. Cl.⁵ .............................................. G06F 7/38
[52] U.S. Cl. .................................................... 364/752
[58] Field of Search ................................. 364/752, 814

[56] References Cited

U.S. PATENT DOCUMENTS

| 4,075,705 | 2/1978 | Kawabata et al. | 364/752 |
| 4,298,951 | 11/1981 | Hall | 364/752 |

FOREIGN PATENT DOCUMENTS

| 62-131335 | 6/1987 | Japan . | |
| 2-219127 | 8/1990 | Japan . | |
| 1023323 | 6/1983 | U.S.S.R. | 364/752 |

*Primary Examiner*—Dale M. Shaw
*Assistant Examiner*—Tan V. Mai

[57] ABSTRACT

An apparatus for calculating the cube root of a number has: a first memory for initially storing a cube root extraction number from which the cube root is to be extracted; a second memory for initially storing a first number which is predetermined based on said cube root extraction number; a third memory for initially storing a second predetermined number; a fourth memory for initially storing a third predetermined number; and a fifth memory for storing a number. The relation in size between the number stored in the first memory and the number stored in the second memory is judged. When the number stored in the first memory is not smaller than the number stored in the second memory, the number stored in the second memory from the number stored in the first memory, a number generated from the number stored in the third memory is added to the number stored in the second memory means, and a fourth predetermined number is added to the number stored in the fifth memory. When the number stored in the first memory is smaller than the number stored in the second memory, a number generated from the number stored in the fourth memory is substracted from the number stored in the second memory, and the number stored in the fifth memory is shifted to the left. Until predetermined conditions are met, the above processes are repeated, and the number stored in said fifth memory is determined as the cube root.

6 Claims, 5 Drawing Sheets

CUBE ROOT CALCULATION APPARATUS

BACKGROUND OF THE INVENTION

1. Field of the Invention

This invention relates to a cube root calculation apparatus, namely to an apparatus for obtaining the cube root of an arbitrary number.

2. Description of the Prior Art

Generally, the cube root of an arbitrary number is obtained by either the method using a logarithmic function and exponential function and the method using Newton's successive-approximation equation.

In the former, the logarithm of a number from which the cube root is to be calculated (hereinafter, such a number is referred to as "a cube root extraction number") is obtained, and the exponent of the number obtained by dividing the logarithm by three is calculated.

In the latter, Newton's successive-approximation equation is applied to a cube root extraction number "A":

$$X_{n+1} = 2 \cdot X_n/3 + A/X_n^2 \quad (n = 0, 1, 2, \ldots)$$

Then, the values $X_1, X_2, X_3, \ldots$ are successively calculated. When $X_m$ and $X_{m+1}$ are equal to or approximately equal to each other, $X_m$ is determined as the cube root of the cube root extraction number "A".

The above-described methods of the prior art require the calculation of special functions such as logarithmic and exponential functions, and also repeated multiplications and divisions, with the result that the time required for the calculation of the cube root of a number in the prior art becomes extremely long. Moreover, the number of digits of the mantissa of a cube root obtained in the prior art depends on the computational accuracy of subroutines used to execute the calculation of the special functions, and also on that of the multications and divisions, so that the number of digits of the mantissa of a cube root cannot be arbitrarily specified.

SUMMARY OF THE INVENTION

The apparatus of this invention, which overcomes the above-discussed and numerous other disadvantages and deficiencies of the prior art, comprises: first memory means for initially storing a cube root extraction number from which the cube root is to be extracted; second memory means for initially storing a first number which is predetermined based on said cube root extraction number; third memory means for initially storing a second predetermined number; fourth memory means for initially storing a third predetermined number; fifth memory means for storing a number; judging means for judging the relation in size between the number stored in said first memory means and the number stored in said second memory means; first process means for, when said judging means judges that the number stored in said first memory means is not smaller than the number stored in said second memory means, subtracting the number stored in said second memory means from the number stored in said first memory means, adding a number generated from the number stored in said third memory means to the number stored in said second memory means, and adding a fourth predetermined number to the number stored in said fifth memory means; second process means for, when said judging means judges that the number stored in said first memory means is smaller than the number stored in said second memory means, subtracting a number generated from the number stored in said fourth memory means from the number stored in said second memory means, and shifting the number stored in said fifth memory means to the left; and control means for controlling said judging means, and said first and second process means, until predetermined conditions are met, and operating said judging means after the operation of said first process means and also after the operation of said process means.

In the appratus, said predetermined conditions may be that the number stored in said fifth memory means has a predetermined place number.

In the above configuration, when said predetermined conditions are met, the number stored in said fifth memory means may be determined as the cube root of said cube root extraction number.

In the apparatus, said apparatus may further comprise sixth memory means for initially storing said said first number, said process means, when said judging means judges that the number stored in said first memory means is smaller than the number stored in said second memory means, subtracting the number stored in said sixth memory means from the number stored in said second memory means, and shifting the number stored in said sixth memory means to the right.

In the above configuration, said predetermined conditions may be that the number stored in said sixth memory means is zero.

In the above configuration, when said predetermined conditions are met, the number stored in said fifth memory means may be determined as the cube root of said cube root extraction number.

Thus, the invention described herein makes possible the objectives of:

(1) providing a cube root calculation apparatus which can calculate the cube root of a number in a much shorter time than in the prior art; and (2) providing a cube root calculation apparatus in which the number of digits of the mantissa of a cube root to be obtained can be arbitrarily specified.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
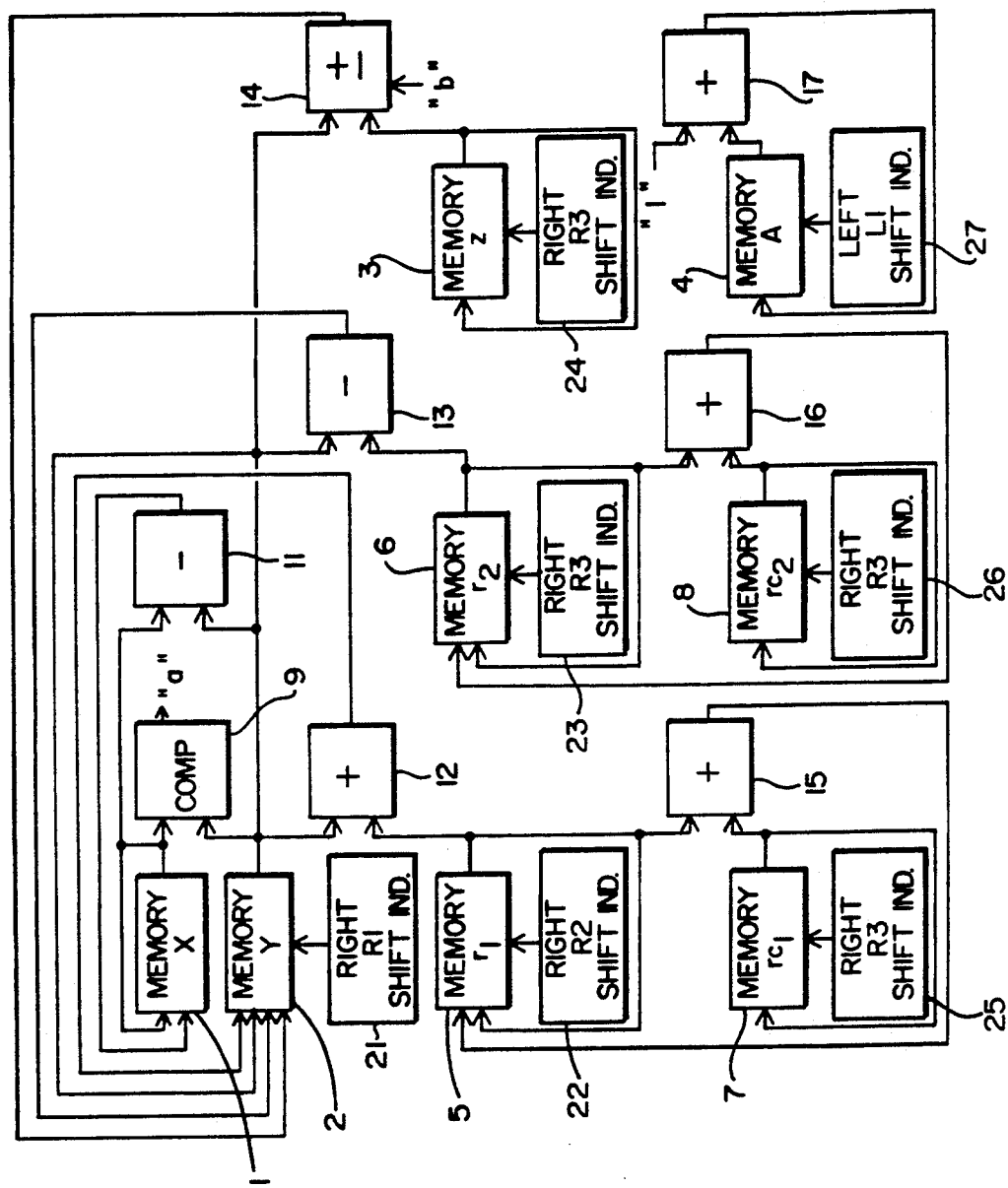
FIG. 1 is a block diagram illustrating an apparatus according to the invention.

FIG. 1 shows a cube root calculation apparatus according to the invention. In the embodiment, the internal calculations are executed using the decimal number system. According to the invention, the internal calculations can be executed using another number system in the essential same manner as in the embodiment except that some of the constants are adequately changed. When a cube root is obtained, the sign (+ or −) and decimal place of the cube root must be determined. The sign of a cube root extraction number is used as that of the cube root of the number. For the latter, if the cube root extraction number includes a decimal fraction part, the cube root extraction number may be made an integer the required number of times by multiplying it by 10 to the third power (when the cube root extraction number is a decimal number), and then the cube root of the integer number is obtained, and the exponent part of the obtained cube root is decreased to adjust the decimal place. To simplify the description, therefore, the cube root extraction number is assumed to be a natural decimal number.

The cube root calculation apparatus of FIG. 1 comprises eight memory devices 1-8 each for storing decimal a decimal number, a comparator 9, subtracters 11 and 13, adders 12 and 15-17, an adder-subtracter 14, right shift indicators 21-26, and a left shift indicator 27.

The stored contents of the memory devices 1-8 are designated as x, y, z, A, $r_1$, $r_2$, $rc_1$ and $rc_2$, respectively. The cube root extraction number is inititially stored in the memory device 1, and the calculated cube root is finally obtained as the contents of the memory device 4. The inputs of the memory devices 1-8 are coupled to the components as summarized in Table 1 below.

TABLE 1

| Memory Devices | Supplied with Outputs of |
| --- | --- |
| 1 (x) | 1 and 11 |
| 2 (y) | 2, 11, 13 and 14 |
| 3 (z) | 3 |
| 4 (A) | 17 |
| 5 ($r_1$) | 5 and 15 |
| 6 ($r_2$) | 6 and 16 |
| 7 ($rc_1$) | 7 |
| 8 ($rc_2$) | 8 |

The memory devices 1, 2, 5 and 6 which have a plurality of inputs are controlled by a control device (not shown) so as to selectively select one of the inputs and store the data on the selected input. The memory devices 1, 2, 5, 6 and 4 correspond respectively to the first to fifth memory means stated in the accompanying claims.

The comparator 9 compares the contents (x) of memory device 1 with the contents (y) of memory device 2, and then supplies a signal "a" based on the relative size of the two contents to the control device mentioned above. The subtracter 11 subtracts the contents (y) of the memory device 2 from the contents (x) of the memory device 1 (x−y). The subtracter 13 subtracts the contents ($r_2$) of the memory device 6 from the contents (y) of the memory device 2 (y−$r_2$).

The adder 12 adds the contents ($r_1$) of the memory device 5 to the contents (y) of the memory device 2 (y+$r_1$). The adder 15 adds the contents ($rc_1$) of the memory device 7 to the contents ($r_1$) of the memory device 5 ($r_1$+$rc_1$). The adder 16 adds the contents ($rc_2$) of the memory device 8 to the contents ($r_2$) of the memory device 6 ($r_2$+$rc_2$). The adder 17 adds 1 to the contents (A) of the memory device 4 (A+1).

The adder-subtracter 14 adds the contents (z) of the memory device 3 to the contents (y) of the memory device 2 (y+z) when it receives a signal "b" from the above-mentioned control device, and, when the signal "b" is not supplied from the control device, it subtracts the contents (z) of the memory device 3 from the contents (y) of the memory device 2 (y−z).

The add and subtract timing of the adders 12, 15 and 16, subtracters 11 and 13, and adder-subtracter 14 is determined by the above-mentioned control device. As shown in FIG. 1 and Table 1, the calculation results obtained from the adders 12, 15 and 16 are stored in the memory devices 2, 7 and 8, respectively. The calculation results obtained from the subtracters 11 and 13, and adder-subtracter 14 are stored in the memory device 1.

The right shift indicators 21-26 indicate to shift the contents of the memory devices 2, 5, 6, 3, 7 and 8 with which they are associated as indicated by the arrows in FIG. 1, to the right; i.e., toward the lower place digits. The numbers in "R1", "R2" and "R3" appearing in the blocks of the right shift indicators are the number of places shifted each time when the corresponding right shift indicator instructs the shift operation. The left shift indicator 27 instructs to shift the contents of the memory device 4 to the left; i.e., toward the upper place digits, one place.

In order to make the description simple, one adder or subtracter is provided for each memory device in the embodiment of FIG. 1, but alternatively one adder or subtracter may be commonly provided to a plurality of memory devices. The cube root extraction calculation apparatus of this embodiment can be constructed so as to have only a hardware configuration, but alternatively it may have a configuration using a general-purpose microprocessor unit (MPU). In the latter case, the memory devices may be implemented using registers of the MPU or the main memory unit, and the other components may be implemented using commands from the MPU for performing the calculation of the contents of the register or main memory. The required commands in this case are mainly commands for adding, subtracting and shifting, which are generally used in a usual MPU. Also in an embodiment in which an MPU is used, therefore, the cube root extraction calculation can be performed extremely fast.

Figure 2:
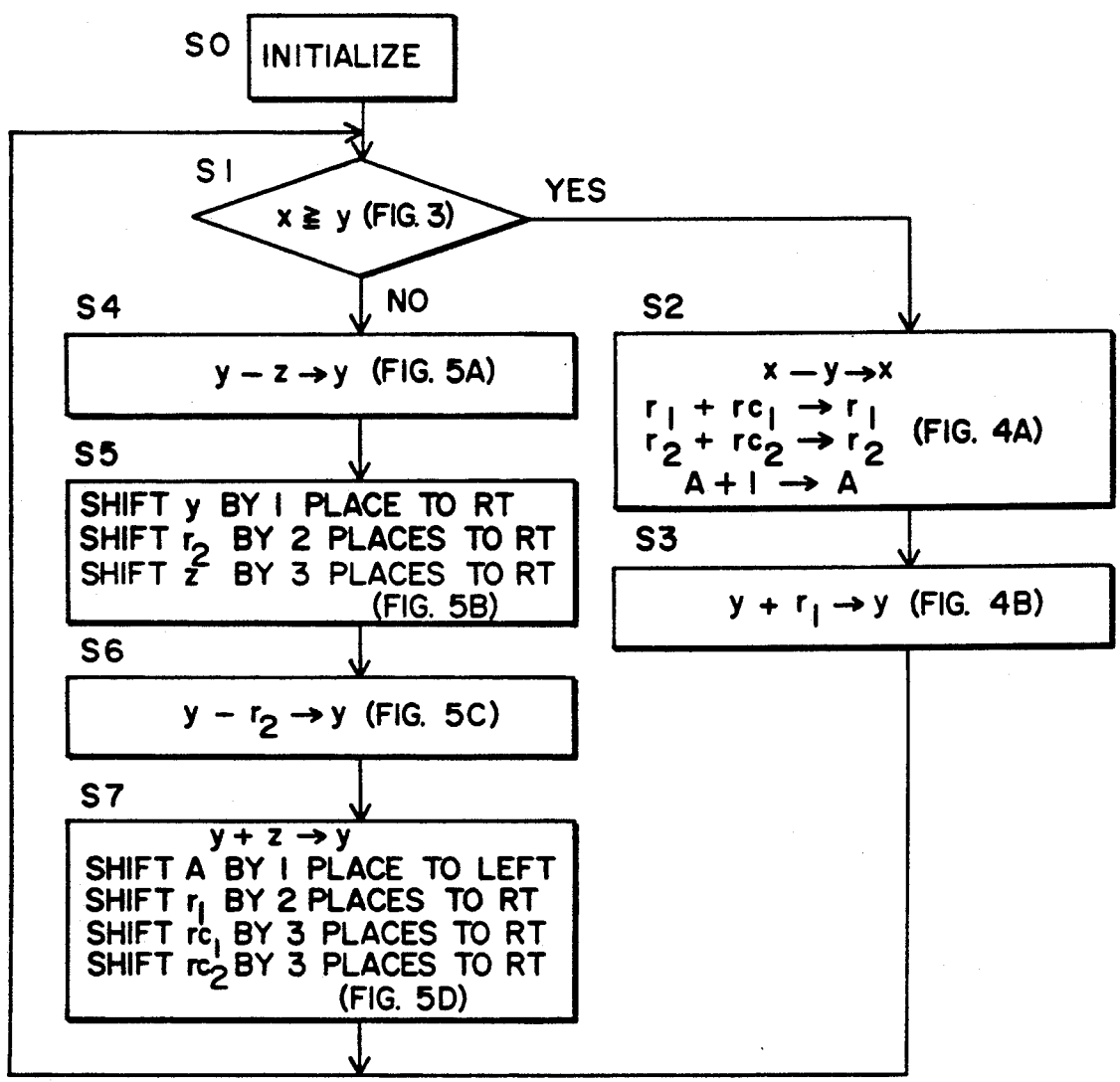
FIG. 2 is a flowchart illustrating the operation of the apparatus of FIG. 1.

The operation of this embodiment will be described with reference to FIG. 2.

(a) First, the memory devices 1-8 are initialized (step S0). As described above, the natural number supplied as the cube root extraction number X is stored in the memory device 1. When the cube root extraction number X satisfies the equation:

$$10^{3(N+1)} > X \geq 10^{3N},$$

$10^{3N}$ is initially set in the memory device 2 (where N is an integer). In other words, the number set in the memory device 2 comprises "1" for the block corresponding to the upper most block when the cube root extraction number is divided up into blocks of three digits each beginning from the low place digit, and "0"s for the digits of the other blocks. The same number as the initial value in the memory device 2 is set in the memory device 3 at first. The initial values in the memory devices 4, 5 and 6 are "0". The numbers initially set in the memory devices 7 and 8 are a number six times and a number 27 times, respectively, the initial value in the memory device 2. In FIG. 1, the means which performs the above initial settings is not shown. In Tables 2 to 27 below, the contents of the memory devices 1-8 in each step are shown wherein the cube root extraction number X is 12,812,904 (=$234^3$).

TABLE 2

| Step S0 Memory Devices | Contents of Memory Devices |
| --- | --- |
| 1 (x) | 12812904 |
| 2 (y) | 1000000 |
| 5 ($r_1$) | 0 |

TABLE 2-continued

| Step S0 Memory Devices | Contents of Memory Devices |
|---|---|
| 6 ($r_2$) | 0 |
| 7 ($rc_1$) | 6000000 |
| 8 ($rc_2$) | 27000000 |
| 3 (z) | 1000000 |
| 4 (A) | 0 |

Figure 3:
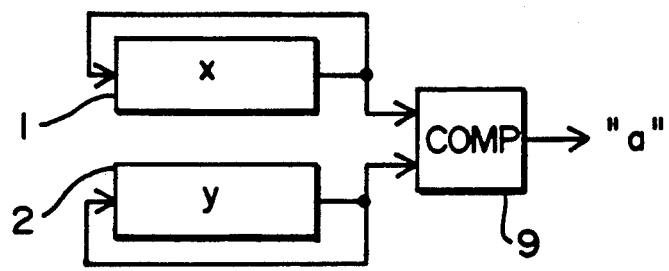
FIGS. 3, 4A and 4B, and 5A to 5D are block diagrams illustrating the portions of the apparatus of FIG. 1 which are involved in each step of the operation.

(b) After the above initial settings are made in step S0, it is determined whether or not x is greater than y (step S1). If $x \geq y$, then the processes in steps S2 and S3 are performed. If $x < y$, then the processes in steps S4 to S7 are performed. The portion of the apparatus of FIG. 1 involved in the comparison process in step S1 is shown in FIG. 3. The signal "a" is output from the comparator 9 in accordance with the comparison result in step S1.

(c) In the example shown in Table 2, x is greater than y in step S1, then the operation proceeds to steps S2 and S3. In step S2, the processes in (1) to (4) below is performed: (1) y is subtracted from x; (2) $rc_1$ is added to $r_1$; (3) $rc_2$ is added to $r_2$; and (4) 1 is added to A.

TABLE 3

| Step S2 Memory Devices | Contents of Memory Devices |
|---|---|
| 1 (x) | 11812904 |
| 2 (y) | 1000000 |
| 5 ($r_1$) | 6000000 |
| 6 ($r_2$) | 27000000 |
| 7 ($rc_1$) | 6000000 |
| 8 ($rc_2$) | 27000000 |
| 3 (z) | 1000000 |
| 4 (A) | 1 |

Figure 4:
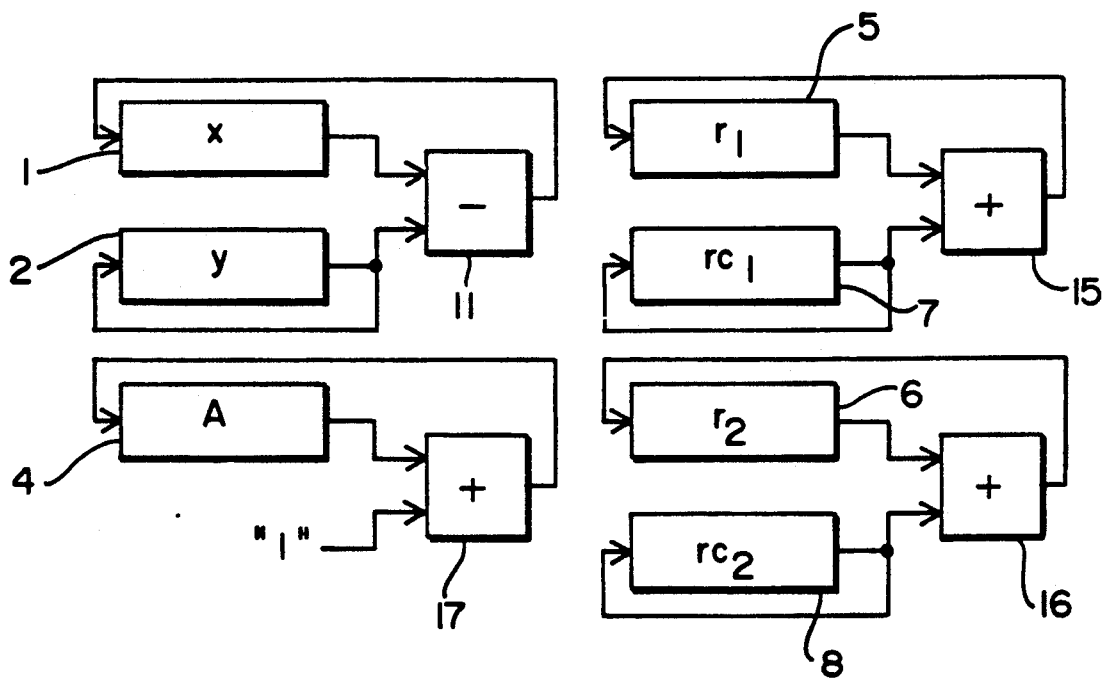
Figure 4:
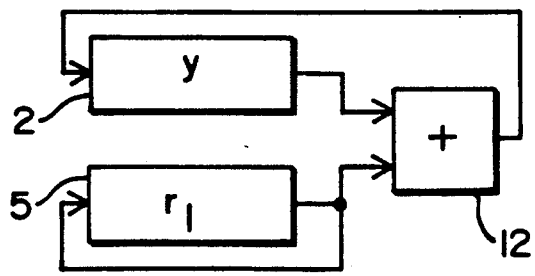

In step S3, $r_1$ is added to y. When the process of step S3 is completed, the operation returns to step S1. The portion of the apparatus involved in the step S2 calculation is shown in FIG. 4A, and that involved in the step S3 calculation is shown in FIG. 4B. After the completion of step S3, the operation returns to Step S1.

TABLE 4

| Step S3 Memory Devices | Contents of Memory Devices |
|---|---|
| 1 (x) | 11812904 |
| 2 (y) | 7000000 |
| 5 ($r_1$) | 6000000 |
| 6 ($r_2$) | 27000000 |
| 7 ($rc_1$) | 6000000 |
| 8 ($rc_2$) | 27000000 |
| 3 (z) | 1000000 |
| 4 (A) | 1 |

(d) In step S1, x is greater than y again. The processes of steps S2 and S3 are repeated.

TABLE 5

| Step S2 Memory Devices | Contents of Memory Devices |
|---|---|
| 1 (x) | 4812904 |
| 2 (y) | 7000000 |
| 5 ($r_1$) | 12000000 |
| 6 ($r_2$) | 54000000 |
| 7 ($rc_1$) | 6000000 |
| 8 ($rc_2$) | 27000000 |
| 3 (z) | 1000000 |
| 4 (A) | 2 |

TABLE 6

| Step S3 Memory Devices | Contents of Memory Devices |
|---|---|
| 1 (x) | 4812904 |
| 2 (y) | 19000000 |
| 5 ($r_1$) | 12000000 |
| 6 ($r_2$) | 54000000 |
| 7 ($rc_1$) | 6000000 |
| 8 ($rc_2$) | 27000000 |
| 3 (z) | 1000000 |
| 4 (A) | 2 |

As a result of the above process in (c) and (d), "2" is obtained as the hundred place digit of the cube root.

Figure 5A:
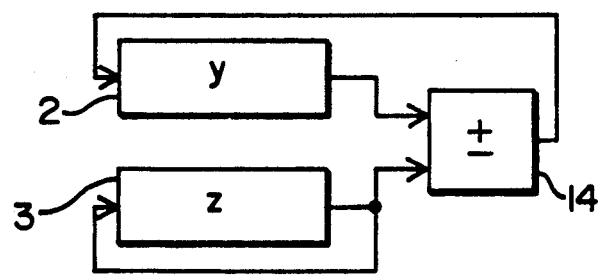

(e) The operation returns again to step S1 wherein it is judged that x is smaller than y. Then, the processes of steps S4 to S7 are performed. In step S4, z is subtracted from y. The portion of the apparatus involved in the step S4 calculation is shown in FIG. 5A. When the step S4 calculation is performed, the signal "b" is not supplied to the adder-subtracter 14, and the adder-subtracter 14 functions as a subtracter.

TABLE 7

| Step S4 Memory Devices | Contents of Memory Devices |
|---|---|
| 1 (x) | 4812904 |
| 2 (y) | 18000000 |
| 5 ($r_1$) | 12000000 |
| 6 ($r_2$) | 54000000 |
| 7 ($rc_1$) | 6000000 |
| 8 ($rc_2$) | 27000000 |
| 3 (z) | 1000000 |
| 4 (A) | 2 |

Figure 5B:
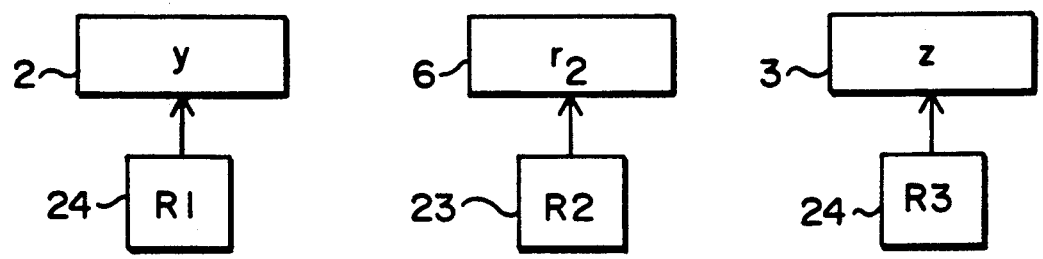

In step S5, y is shifted one place to the right, $r_2$ is shifted two places to the right, and z is shifted three places to the right. The portion of the apparatus involved in the step S5 calculation is shown in FIG. 5B.

TABLE 8

| Step S5 Memory Devices | Contents of Memory Devices |
|---|---|
| 1 (x) | 4812904 |
| 2 (y) | 1800000 |
| 5 ($r_1$) | 12000000 |
| 6 ($r_2$) | 540000 |
| 7 ($rc_1$) | 6000000 |
| 8 ($rc_2$) | 27000000 |
| 3 (z) | 1000 |
| 4 (A) | 2 |

Figure 5C:
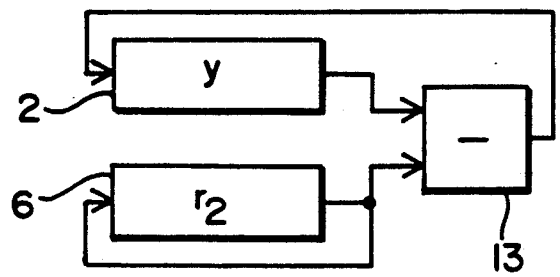

In step S6, $r_2$ is subtracted from y. The portion of the apparatus involved in the step S6 calculation is shown in FIG. 5C.

TABLE 9

| Step S6 Memory Devices | Contents of Memory Devices |
|---|---|
| 1 (x) | 4812904 |
| 2 (y) | 1260000 |
| 5 ($r_1$) | 12000000 |
| 6 ($r_2$) | 540000 |
| 7 ($rc_1$) | 6000000 |
| 8 ($rc_2$) | 27000000 |
| 3 (z) | 1000 |
| 4 (A) | 2 |

Figure 5D:
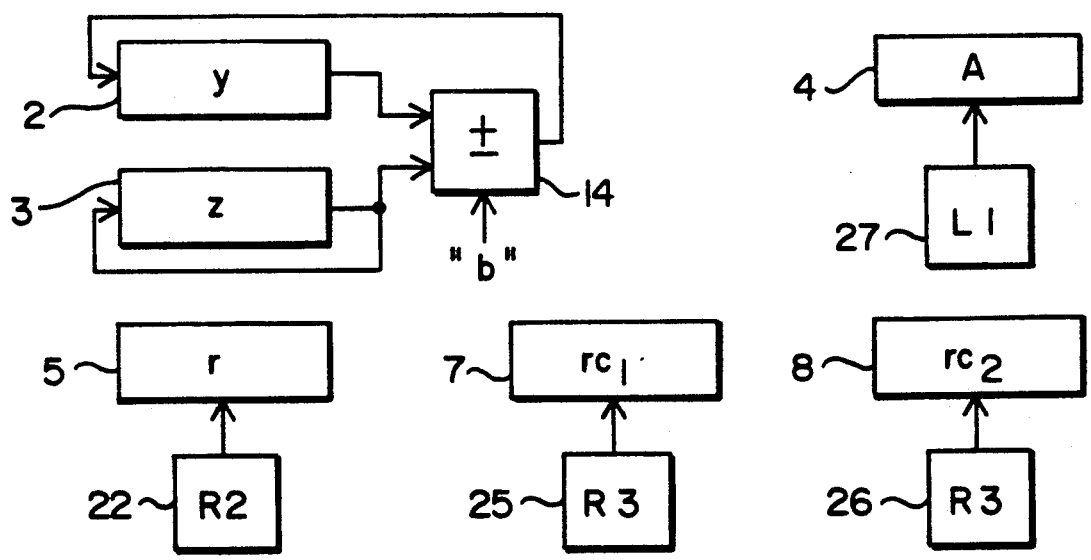

In step S7, the processes in (5) to (9) below are performed: (5) z is added to y; (6) A is shifted one place to the left; (7) $r_1$ is shifted two places to the right; (8) $rc_1$ is shifted three places to the right; (9) $rc_2$ is shifted three places to the right. That portion of the apparatus involved in the step S7 calculation is shown in FIG. 5D. When the step S7 calculation is performed, the signal "b" is supplied to the adder-subtracter 14 so that the adder-subtracter 14 functions as an adder.

TABLE 10

| Step S7 Memory Devices | Contents of Memory Devices |
| --- | --- |
| 1 (x) | 4812904 |
| 2 (y) | 1261000 |
| 5 ($r_1$) | 120000 |
| 6 ($r_2$) | 540000 |
| 7 ($rc_1$) | 6000 |
| 8 ($rc_2$) | 27000 |
| 3 (z) | 1000 |
| 4 (A) | 20 |

As a result of the above process in (e), the preparation of obtaining the 10's place of the cube root has been done. When the process of step S7 is completed, the operation returns to step S1.

(f) In step S1, x is greater than y. Hence the processes of steps S2 and S3 are performed with the result summarized in Tables 11 and 12.

TABLE 11

| Step S2 Memory Devices | Contents of Memory Devices |
| --- | --- |
| 1 (x) | 3551904 |
| 2 (y) | 1261000 |
| 5 ($r_1$) | 126000 |
| 6 ($r_2$) | 567000 |
| 7 ($rc_1$) | 6000 |
| 8 ($rc_2$) | 27000 |
| 3 (z) | 1000 |
| 4 (A) | 21 |

TABLE 12

| Step S3 Memory Devices | Contents of Memory Devices |
| --- | --- |
| 1 (x) | 3551904 |
| 2 (y) | 1387000 |
| 5 ($r_1$) | 126000 |
| 6 ($r_2$) | 567000 |
| 7 ($rc_1$) | 6000 |
| 8 ($rc_2$) | 27000 |
| 3 (z) | 1000 |
| 4 (A) | 21 |

(g) In step S1, x is again greater than y, and hence the processes of steps S2 and S3 are repeated.

TABLE 13

| Step S2 Memory Devices | Contents of Memory Devices |
| --- | --- |
| 1 (x) | 2164904 |
| 2 (y) | 1387000 |
| 5 ($r_1$) | 132000 |
| 6 ($r_2$) | 594000 |
| 7 ($rc_1$) | 6000 |
| 8 ($rc_2$) | 27000 |
| 3 (z) | 1000 |
| 4 (A) | 22 |

TABLE 14

| Step S3 Memory Devices | Contents of Memory Devices |
| --- | --- |
| 1 (x) | 2164904 |
| 2 (y) | 1519000 |
| 5 ($r_1$) | 132000 |
| 6 ($r_2$) | 594000 |

TABLE 14-continued

| Step S3 Memory Devices | Contents of Memory Devices |
| --- | --- |
| 7 ($rc_1$) | 6000 |
| 8 ($rc_2$) | 27000 |
| 3 (z) | 1000 |
| 4 (A) | 22 |

(h) In step S1, x is again greater than y, and hence the processes of steps S2 and S3 are repeated with result summarized in Tables 15 and 16 below.

TABLE 15

| Step S2 Memory Devices | Contents of Memory Devices |
| --- | --- |
| 1 (x) | 645904 |
| 2 (y) | 1519000 |
| 5 ($r_1$) | 138000 |
| 6 ($r_2$) | 621000 |
| 7 ($rc_1$) | 6000 |
| 8 ($rc_2$) | 27000 |
| 3 (z) | 1000 |
| 4 (A) | 23 |

TABLE 16

| Step S3 Memory Devices | Contents of Memory Devices |
| --- | --- |
| 1 (x) | 645904 |
| 2 (y) | 1657000 |
| 5 ($r_1$) | 138000 |
| 6 ($r_2$) | 621000 |
| 7 ($rc_1$) | 6000 |
| 8 ($rc_2$) | 27000 |
| 3 (z) | 1000 |
| 4 (A) | 23 |

As a result of above (f), (g) and (h), the 10's place number "3" of the cube root is obtained.

(i) Next, x is smaller than y in step S1, and then the processes of steps S4 to S7 are sequentially performed to prepare for obtaining the 1's place of the cube root. The results of steps S4 to S7 are indicated in Tables 17 to 20, respectively.

TABLE 17

| Step S4 Memory Devices | Contents of Memory Devices |
| --- | --- |
| 1 (x) | 645904 |
| 2 (y) | 1656000 |
| 5 ($r_1$) | 138000 |
| 6 ($r_2$) | 621000 |
| 7 ($rc_1$) | 6000 |
| 8 ($rc_2$) | 27000 |
| 3 (z) | 1000 |
| 4 (A) | 23 |

TABLE 18

| Step S5 Memory Devices | Contents of Memory Devices |
| --- | --- |
| 1 (x) | 645904 |
| 2 (y) | 165600 |
| 5 ($r_1$) | 138000 |
| 6 ($r_2$) | 6210 |
| 7 ($rc_1$) | 6000 |
| 8 ($rc_2$) | 27000 |
| 3 (z) | 1 |
| 4 (A) | 23 |

TABLE 19

| Memory Devices | Step S6 Contents of Memory Devices |
|---|---|
| 1 (x) | 645904 |
| 2 (y) | 159390 |
| 5 ($r_1$) | 138000 |
| 6 ($r_2$) | 6210 |
| 7 ($rc_1$) | 6000 |
| 8 ($rc_2$) | 27000 |
| 3 (z) | 1 |
| 4 (A) | 23 |

TABLE 20

| Memory Devices | Step S7 Contents of Memory Devices |
|---|---|
| 1 (x) | 645904 |
| 2 (y) | 159391 |
| 5 ($r_1$) | 1380 |
| 6 ($r_2$) | 6210 |
| 7 ($rc_1$) | 6 |
| 8 ($rc_2$) | 27 |
| 3 (z) | 1 |
| 4 (A) | 230 |

(j) In step S1, x is greater than y so that the operation proceeds to steps S2 and S3.

TABLE 21

| Memory Devices | Step S2 Contents of Memory Devices |
|---|---|
| 1 (x) | 486513 |
| 2 (y) | 159391 |
| 5 ($r_1$) | 1386 |
| 6 ($r_2$) | 6237 |
| 7 ($rc_1$) | 6 |
| 8 ($rc_2$) | 27 |
| 3 (z) | 1 |
| 4 (A) | 231 |

TABLE 22

| Memory Devices | Step S3 Contents of Memory Devices |
|---|---|
| 1 (x) | 486513 |
| 2 (y) | 160777 |
| 5 ($r_1$) | 1386 |
| 6 ($r_2$) | 6237 |
| 7 ($rc_1$) | 6 |
| 8 ($rc_2$) | 27 |
| 3 (z) | 1 |
| 4 (A) | 231 |

(k) In step S1, x is again greater than y so that the processes of steps S2 and S3 are repeated.

TABLE 23

| Memory Devices | Step S2 Contents of Memory Devices |
|---|---|
| 1 (x) | 325736 |
| 2 (y) | 160777 |
| 5 ($r_1$) | 1392 |
| 6 ($r_2$) | 6264 |
| 7 ($rc_1$) | 6 |
| 8 ($rc_2$) | 27 |
| 3 (z) | 1 |
| 4 (A) | 232 |

TABLE 24

| Memory Devices | Step S3 Contents of Memory Devices |
|---|---|
| 1 (x) | 325736 |

TABLE 24-continued

| Memory Devices | Step S3 Contents of Memory Devices |
|---|---|
| 2 (y) | 162169 |
| 5 ($r_1$) | 1392 |
| 6 ($r_2$) | 6264 |
| 7 ($rc_1$) | 6 |
| 8 ($rc_2$) | 27 |
| 3 (z) | 1 |
| 4 (A) | 232 |

(1) In step S1, x is again greater than y so that the processes of steps S2 and S3 are again repeated.

TABLE 25

| Memory Devices | Step S2 Contents of Memory Devices |
|---|---|
| 1 (x) | 163567 |
| 2 (y) | 162169 |
| 5 ($r_1$) | 1398 |
| 6 ($r_2$) | 6291 |
| 7 ($rc_1$) | 6 |
| 8 ($rc_2$) | 27 |
| 3 (z) | 1 |
| 4 (A) | 233 |

TABLE 26

| Memory Devices | Step S3 Contents of Memory Devices |
|---|---|
| 1 (x) | 163567 |
| 2 (y) | 163567 |
| 5 ($r_1$) | 1398 |
| 6 ($r_2$) | 6291 |
| 7 ($rc_1$) | 6 |
| 8 ($rc_2$) | 27 |
| 3 (z) | 1 |
| 4 (A) | 233 |

(m) In step S1, $x \geq y$ is further valid, and the process of step S2 is further performed. As a result, the contents of the memory devices become as indicated in Table 27 below.

TABLE 27

| Step S2 Memory Devices | Contents of Memory Devices |
|---|---|
| 1 (x) | 0 |
| 2 (y) | 163567 |
| 5 ($r_1$) | 1494 |
| 6 ($r_2$) | 6318 |
| 7 ($rc_1$) | 6 |
| 8 ($rc_2$) | 27 |
| 3 (z) | 1 |
| 4 (A) | 234 |

The value "A" stored in the memory device 4 is equal to the cube root, and at this time x=0. In this way, it can be efficiently judged whether or not the cube root extraction calculation is completed, by checking the value of x (i.e., the contents of the memory device 1) upon completion of the process in step S2 and escaping from the loop when x is determined to be 0. However, since the condition x=0 is only valid when the cube root extraction number is exactly the cube of some number, this completion condition cannot be applied to all cube root extraction numbers. Therefore, escape from the loop and terminating cube root extraction calculation can generally be performed when, for example, (1) the value of "A" (i.e., the contents of the memory device 4) reaches a predetermined number of places, or (2) z=0 becomes valid.

For example, if the judgment of whether x=0 after step S2 is omitted and judgment of whether z=0 is performed after step S5, the following additional processes (n) and (o) become necessary in the calculation example described above.

(n) The process of step S3 is further performed after (m).

TABLE 28

| | Step S3 |
|---|---|
| Memory Devices | Contents of Memory Devices |
| 1 (x) | 0 |
| 2 (y) | 164971 |
| 5 ($r_1$) | 1494 |
| 6 ($r_2$) | 6318 |
| 7 ($rc_1$) | 6 |
| 8 ($rc_2$) | 27 |
| 3 (z) | 1 |
| 4 (A) | 234 |

(o) In step S1, it is judged that x<y to that the operation proceeds to steps S4 and S5. In step S4, since z is null, y is not changed. After step S5, it is judged that z=0, and then the cube root calculation is terminated.

TABLE 29

| | Step S4 |
|---|---|
| Memory Devices | Contents of Memory Devices |
| 1 (x) | 0 |
| 2 (y) | 164971 |
| 5 ($r_1$) | 1494 |
| 6 ($r_2$) | 6318 |
| 7 ($rc_1$) | 6 |
| 8 ($rc_2$) | 27 |
| 3 (z) | 1 |
| 4 (A) | 234 |

TABLE 30

| | Step S5 |
|---|---|
| Memory Devices | Contents of Memory Devices |
| 1 (x) | 0 |
| 2 (y) | 16497 |
| 5 ($r_1$) | 1494 |
| 6 ($r_2$) | 63 |
| 7 ($rc_1$) | 6 |
| 8 ($rc_2$) | 27 |
| 3 (z) | 0 |
| 4 (A) | 234 |

As is apparent from the above description, cube roots can be calculated to any desired place.

Below is a supplemental description of the operation of this embodiment.

If the cube root extraction number X (the initial value of x) satisfies $$10^{3(N+1)} > X \geq 10^{3N},$$

then the initial value of y is $10^{3N}$ as described above. On the other hand, the initial value of $rc_1$ can be expressed using a natural number n as follows:

$$rc_1 = 10^{3N}[\{(n+2)^3 - (n+1)^3\} - \{(n+1)^3 - n^3\} - [\{(n+1)^3 - n^3\} - \{n^3 - (n-1)^3\}]] \quad (1)$$
$$= 6 \cdot 10^{3N}$$

When the processes in steps S2 and S3 are repeated n times while $x \geq$ is valid, then $$r_1 = 10^{3N}[\{(n+1)^3 - n^3\} - \{n^3 - (n-1)^3\}] \quad (2)$$
$$= 6n \cdot 10^{3N}$$

$$y = 10^{3N}\{(n+1)^3 - n^3\} \quad (3)$$

Then, x and A become as follows:

$$x = X - 10^{3N} - 10^{3N}(2^3 - 1^3) - \ldots - \quad (4)$$
$$10^{3N}\{n^3 - (n-1)^3\}$$
$$= X - 10^{3N} \cdot n^3$$

$$A = n \quad (5)$$

and A is obtained as the upper most place of the cube root.

Next, the processes in steps S4 to S7 are described. When the equation (3) is deformed, $$y = 10^{3(N-1)}\{(10n+10)^3 - (10n)^3\} \quad (6)$$

The initial value of $rc_2$ is $$rc_2 = 27 \cdot 10^{3N} \quad (7)$$

so $r_2$ just before the process in step S4 is performed is expressed as $$r_2 = 27n \cdot 10^{3N} \quad (8)$$

In step S4, y is replaced by $$y - z = 10^{3(N-1)}\{(10n+10)^3 - (10n)^3 - 10^3\} \quad (9)$$
$$= 3 \cdot 10^3(n^2 + n) \cdot 10^{3(N-1)}$$

In step S5, $$r_2 = 270n \cdot 10^{3(N-1)} \quad (10)$$

$$y = 3 \cdot 10^2(n^2 + n) \cdot 10^{3(N-1)} \quad (11)$$

$$z = 10^{3(N-1)} \quad (12)$$

After the processes of steps S6 and S7, y becomes as follows:

$$y = 10^{3(N-1)}\{300(n^2 + n) - 270n + 1\} \quad (13)$$
$$= 10^{3(N-1)}(10^3 \cdot n^3 + 300n^2 + 30n + 1 - 10^3 \cdot n^3)$$
$$= 10^{3(N-1)}\{(10n+1)^3 - (10n)^3\}$$

And $r_1$ expressed by equation (2) is changed by shifting two places to the right in step S7 to $$r_1 = 10^{3(N-1)}[(10n+1)^3 - (10n)^3 - \quad (14)$$
$$\{(10n)^3 - (10n-1)^3\}]$$
$$= 60n \cdot 10^{3(N-1)}$$

In this way, preparation for seeking the next place of the cube root is performed.

Next, when the processes in steps S2 and S3 are repeated m times while $x \geq y$ is valid, then y, x and A become as shown below.

$$y = 10^{3(N-1)}[(10n+m+1)^3 - (10n+m)^3] \quad (15)$$

$$x = X - 10^{3(N-1)}(10n+m)^3 \quad (16)$$

$$A = 10n + m \quad (17)$$

And $r_1$ becomes $$\begin{aligned} r_1 &= 10^{3(N-1)}[(10n+m+1)^3 - (10n+m)^3 - \\ &\quad \{(10n+m)^3 - (10n+m-1)^3\}] \\ &= 10^{3(N-1)}(60n + 6m) \end{aligned} \quad (18)$$

Calculation proceeds in the sequence described above, and when $x = 0$, then A becomes the cube root.

In this way, according to the invention, the cube root of any desired cube root extraction number with the desired precision (number of places) can be obtained extremely fast.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A cube root calculation apparatus comprising:
   first memory means for initially storing a cube root extraction number from which the cube root is to be extracted;
   second memory means for initially storing a first number which is predetermined based on said cube root extraction number;
   third memory means for initially storing a second predetermined number;
   fourth memory means for initially storing a third predetermined number;
   fifth memory means for storing a number;
   judging means for judging the relation in size between the number stored in said first memory means and the number stored in said second memory means;
   first process means for, when said judging means judges that the number stored in said first memory means is not smaller than the number stored in said second memory means, subtracting the number stored in said second memory means from the number stored in said first memory means, adding a number generated from the number stored in said third memory means to the number stored in said second memory means, and adding a fourth predetermined number to the number stroed in said fifth memory means;
   second process means for, when said judging means judges that the number stored in said first memory means is smaller than the number stored in said second memory means, subtracting a number generated from the number stored in said fourth memory means from the number stored in said second memory means, and shifting the number stored in said fifth memory means to the left; and
   control means for controlling said judging means, and said first and second process means, until predetermined conditions are met, and operating said judging means after the operation of said first process means and also after the operation of said process means.

2. An apparatus according to claim 1, wherein said predetermined conditions are that the number stored in said fifth memory means has a predetermined place number.

3. An apparatus according to claim 2, wherein, when said predetermined conditions are met, the number stored in said fifth memory means is determined as the cube root of said cube root extraction number.

4. An apparatus according to claim 1, wherein said apparatus further comprises sixth memory means for initially storing said first number,
   said process means, when said judging means judges that the number stored in said first memory means is smaller than the number stored in said second memory means, subtracting the number stored in said sixth memory means from the number stored in said second memory means, and shifting the number stored in said sixth memory means to the right.

5. An apparatus according to claim 4, wherein said predetermined conditions are that the number stored in said sixth memory means is zero.

6. An apparatus according to claim 5, wherein, when said predetermined conditions are met, the number stored in said fifth memory means is determined as the cube root of said cube root extraction number.

* * * * *